United States Patent [19]

Firstenberg

[11] 3,927,282

[45] Dec. 16, 1975

[54] BUTTONS FOR ATTACHMENT TO PUSH-BUTTON TELEPHONE KEYS

[76] Inventor: Harold S. Firstenberg, 131 Townsend St., San Francisco, Calif. 94107

[22] Filed: Oct. 18, 1973

[21] Appl. No.: 407,533

[52] U.S. Cl. .................................. 179/178; 179/90 A

[51] Int. Cl.[2] .......................................... H04M 1/23

[58] Field of Search ........... 179/90 K, 90 A, 90 AT, 179/178, 179, 184; 200/340, 333; 235/145 R; 35/5; 40/331, 332, 336, 337

[56] References Cited

UNITED STATES PATENTS

| | | | |
|---|---|---|---|
| 1,148,721 | 8/1915 | Scott | 197/102 |
| 1,717,765 | 6/1929 | Dunn | 197/102 X |
| 2,885,518 | 5/1959 | Brictson | 200/333 |
| 3,169,701 | 2/1965 | Dombrowski | 235/145 R |
| 3,739,105 | 6/1973 | Anson | 179/90 K |

FOREIGN PATENTS OR APPLICATIONS

| | | | |
|---|---|---|---|
| 406,981 | 8/1944 | Italy | 197/102 |

*Primary Examiner*—Thomas W. Brown
*Attorney, Agent, or Firm*—Julian Caplan

[57] ABSTRACT

Buttons to fit on the recently-introduced touch-tone telephone instrument keys are of larger size than the keys, occupying substantially all the space between the keys and also extending laterally and longitudinally. The bottom of each button is formed with a cavity complementary to the top of the key so that the buttons may be pressed onto the keys and are not dislodged. Large, highly visible numerals from "1" to "9" are centered on the top of each button and appropriate letters may also be added, as on dial telephones. Alternatively, the buttons may be permanently encased in a plastic holder which allows movement of the buttons to actuate the keys and the holder has space for useful information, such as the telephone number of the instrument to which it is attached, other numbers, including emergency numbers, and advertising.

3 Claims, 5 Drawing Figures

BUTTONS FOR ATTACHMENT TO PUSH-BUTTON TELEPHONE KEYS

This invention relates to a set of new and improved buttons for attachment to "TOUCH-TONE" telephone keys. A recent improvement in telephone instruments provides on a panel on the base of the telephone instrument 12 keys which project up from the interior of the base, arranged in three columns of four rows each. The uppermost three rows have numerals "1" to "9" inclusive. The center key of the fourth row has the numeral "0" and the keys to either side have symbols which at present have no useful purpose. This instrument replaces the well-known dial telephone instrument. The buttons of the present invention are intended for attachment to the keys.

One of the features of the present invention is that the buttons have a surface area which is substantially larger than that of the keys presently used and occupy most of the space between the keys and extend laterally and longitudinally overhanging the outermost keys. The larger surface area of the buttons makes it possible to locate and depress them more easily. The larger area also makes it possible to display the numeral and letters represented by the button most prominently so that the user may read them more readily. At the present time, the size of the numerals on the keys occasions difficulty in reading without glasses where there are sight problems. Furthermore, the large gaps between keys makes it difficult to strike the proper key since the finger tends to strike and slide off the center of the key.

Another feature of the invention is the fact that the buttom button provided in accordance with this invention optionally extends not only over the "0" key but also laterally to either side, overhanging the unused buttons. It will be understood that the zero is the most frequent key used in normal telephone switching and the larger button makes it possible to strike this key with greater facility. The two keys on either side of the "0" are intended for future use. Appropriately designated extra buttons for these keys may be provided for future installation at the proper time, and also a small "0" button to replace the wide bottom button.

Another feature of the invention is the fact that the buttons may be merchandised in a card provided with apertures into which the buttons slideably fit. The apertures are so arranged that the card may be placed over the telephone keys and the buttons individually depressed, causing pressure-sensitive adhesive in a cavity in the bottom of each button to hold the button in place. Alternatively the cavity may be dimensioned so that the bottom fits on the key with a press fit. This means of packaging the buttons facilitates installation and prevents errors which would occur if the wrong button were installed on a key.

Alternatively the buttons may be merchandised held permanently in a holder which permits the buttons to slide the same distance the keys are depressed.

Other objects of the present invention will become apparent upon reading the following specification and referring to the accompanying drawings in which similar characters of reference represent corresponding parts in each of the several views.

Figure 3:
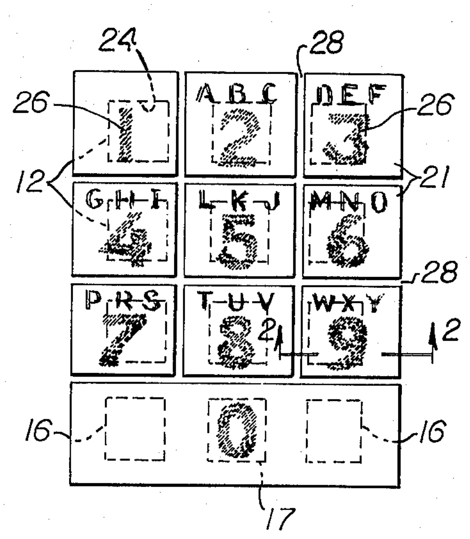
FIG. 3 is a schematic top plan view showing the buttons positioned on keys of the array of keys on the panel.
Figure 2:
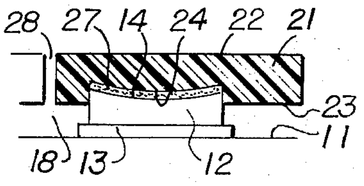
FIG. 2 is an enlarged fragmentary sectional view showing the attachment of a button to one of the keys as viewed along the line 2—2 of FIG. 3.

The recently introduced telephone instrument which has heretofore been described has a slanted panel 11 on its base from which project a plurality of keys. The keys 12 comprise the numbers 1–9 inclusive. Each key 12 is surrounded by a rim 13 projecting through the panel 11. The rim 13 provides a bearing and a centering for the key enabling the latter to be depressed when the user wishes to call a particular number. Each key 12 has a concave top surface 14 and is generally rectangular in plan. The keys 12 are arranged in three columns of three rows each and below the buttom row is a fourth row in which the center key 17 has a "0" and the keys 16 to either side of key 17 have symbols "*" or " # ". The keys 16 have no present use on the instrument and are intended, according to the inventor's understanding, for future use. There is a considerable gap 18 between the adjacent keys, said gap existing between the "1" and "2" keys and also between the "1" and "4" keys, as well as other keys, as will be readily understood.

The present invention provides nine buttons 21 to fit on the "1" to "9" keys. Each button 21 has a top surface 22 which may be flat or slightly concave and also has a bottom 23 formed with a cavity 24 which is complementary to the top 14 of the keys 12. Large figures "1" to "9" inclusive are displayed on the buttons 21, as well as appropriate corresponding letters appearing on present telephone dials, these being considerably larger than the numerals on the corresponding keys, as is made possible by the greater surface area of top 22. The numerals and letters may be in colors and also may be in different colors for adjacent keys to facilitate the user striking the right button, particularly when the user has a sight problem. Each cavity 24 may be provided with pressure-sensitive adhesive 27 which causes the button 22 to adhere to the key 12. Preferably the cavity 24 is dimensioned so the button may be installed on the key with a press fit.

The cavity 24 of the "5" button is centered relative to the "5" button 21. The distance which the "5" button 21 extends in a vertical sense, as viewed in FIG. 3, is defined in that said distance is one-half the distance between the upper edge of the "5" key 21 and the bottom edge of the "2" key 12 less one-half of a narrow gap 28 (approximately one thirty-second inch) which separates the "2" and "5" keys, it being understood that said gap 28 is considerably less than the gap 18. The distance which the "5" button 21 extends toward the "4" button is the maximum possible. As is clear from FIG. 3, the socket 24 in the "4" button is not centered but is offset to the right. Only sufficient wall thickness is left in the bottom surface 23 to provide a sufficiently strong margin around the cavity 24 in said "4" button. A vertical gap 28 exists between the "4"

and "5" buttons. Thus, the size of the "5" button is defined. Having thus defined the "5" button, the other eight buttons are dimensioned similarly. The "1" button has its cavity 24 located adjacent the lower right-hand corner with sufficient wall thickness to provide a strong margin around the cavity 24. The cavity 24 in the "2" button is located centered laterally but toward the bottom edge of the button. The cavity in the "3" button is located toward the lower left-hand corner. The cavity in the "4" button is centered longitudinally but is located toward the right-hand side. The cavity in the "5" button has heretofore been described as centered relative thereto. The cavity in the "6" button is centered longitudinally but offset laterally to the left. The cavity in the "7" button is centered longitudinally but offset toward the right. The cavity in the "8" button is centered. The cavity in the "9" button is centered longitudinally but offset to the left.

Optionally, instead of having separate buttons for the keys 16 and 17, a single button 29 may be provided which is laterally elongated and has a width equal to the width of a row of buttons 21. Said button 29 displays the zero and spans the two keys 16 to either side of the zero key 17 to which the button 29 is attached. Thus a cavity (not shown) similar to cavity 24 is formed in the bottom of button 29 dimensioned to fit over the zero key 17 and to be secured thereto.

Figure 5:
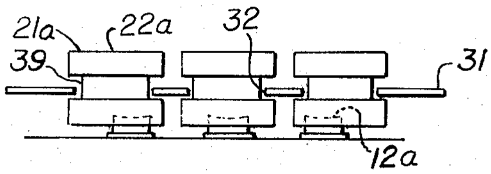
FIG. 5 is a fragmentary enlarged sectional view taken substantially along the line 5—5 of FIG. 4 showing the buttons installed.
Figure 1:
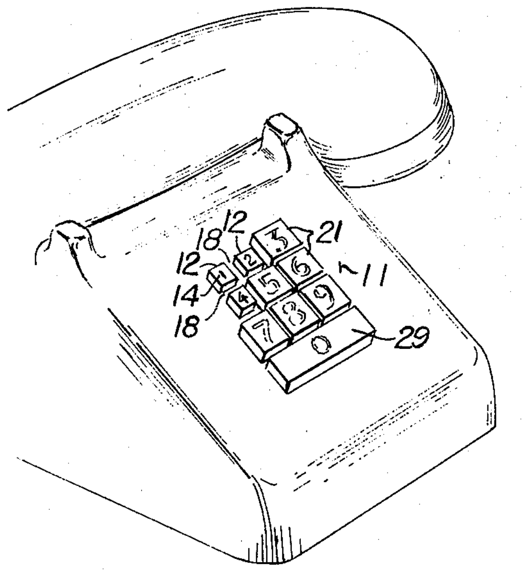
FIG. 1 is a fragmentary schematic perspective view of a telephone instrument on which the present invention is installed, the buttons being installed on some but not all of the keys in order to illustrate the relationship of the buttons to the keys.
Figure 4:
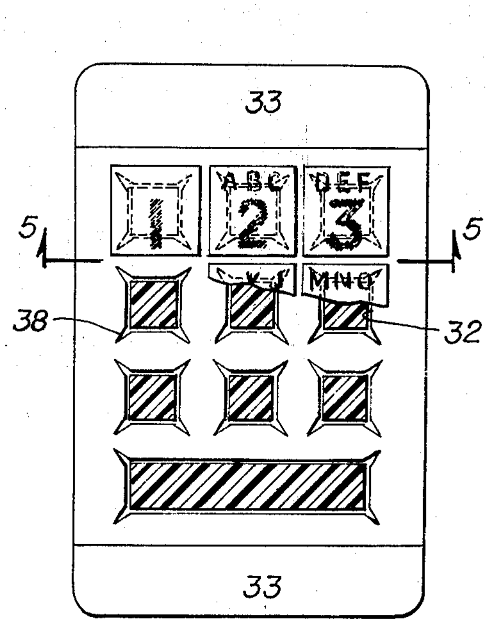
FIG. 4 is a plan view of a modification showing the buttons in a holder in which they are merchandised and used.

As an optional feature of the invention as shown in FIGS. 4 and 5, a card 31 of cardboard, plastic or metal may be provided formed with a plurality of holes 32, each hole 32 being dimensioned to slideably receive one of the buttons 21 and preferably formed with outward slanted triangular cuts 38 which afford flexibility. Where a large zero button 29 is used the bottom hole is of a size to accommodate the same. The spacing of the holes 32 is such that the buttons 21 received in the holes are in the exact relationship of the buttons when they are properly positioned on the keys. Shallow circumferential grooves 39 are formed in buttons 21 and these are of a width slightly more than the sum of the thickness of card 31 plus the movement of keys 12 when depressed. The holes 32 thus fit in the grooves 39 and the cuts 38 permit insertion.

Thus the user need merely place the card 31 over the panel 11 with the cavities 24 in the bottom of the buttons located over the tops of the keys 12. By depressing the buttons, the buttons stick to the tops of the keys. Since the buttons 21 are located at the factory in the proper relationship there is no danger of the wrong button being installed on each key.

Panels 33 on the top, bottom and/or sides of card 31 are available for advertising, for the number of the telephone on which installed, for emergency numbers, or the like.

What is claimed is:

1. For use with keys of the type having a rectangular shape which are positioned on a keyboard in an array of columns and rows with a first gap between the adjacent margins of said keys, a plurality of buttons each having a body having a top and a bottom, said bottom formed with a recess complementary in shape to the upper end of one of said keys, said top being rectangular in plan and dimensioned substantially larger than the tops of said keys so that when said buttons are installed on said keys the distance between adjacent margins of said buttons is substantially less than said first gap, each said top provided with a large, highly visible numeral, the top of each said key being concave and the bottom of said recess being convex with pressure-sensitive adhesive on the bottom of said recess to cause each said button to adhere to an individual key, the recesses in the bottoms of some of said buttons being centered, the recesses in others of said buttons being offset laterally and the recesses in others of said buttons being offset longitudinally, tops of said buttons being wholly exposed and unobstructed by any structure located above said tops of said buttons, the contiguous edges of adjacent buttons being disposed in close proximity to each other whereby the tops of all said buttons when positioned on said entire array of keys are disposed with minimal gaps between buttons, a thin card having dimensions greater than said array of keys, said card being formed with a plurality of substantially rectangular apertures corresponding in number to said buttons, each said button having rectangular sides, each said side formed with a groove of a breadth at least equal to the thickness of said card plus the extent of movement of one of said keys when said key is activated, the grooves on all said sides extending continuously around the periphery of said button, the margins of said apertures being within said grooves, said card being dimensioned larger than said array of keys and being formed with at least one marginal panel for display of information of the character of emergency telephone numbers, advertising matter or the like.

2. Buttons according to claim 1 in which one of said plurality of buttons is of more than three times the width of others of said buttons, said one button being attached to the middle key of a row of three keys and said button extending above the tops of the two keys to either side of said middle key, the bottom of said last-mentioned button being recessed whereby when said last-mentioned button is depressed said middle key is depressed but said two keys to either side of said middle key are not depressed.

3. The combination of claim 1 wherein the corners of said apertures are formed with outward extending cuts, whereby said buttons may be depressed into said card until said buttons snap into said apertures and are held in place by said card.

* * * * *